United States Patent [19]

Boldizar

[11] 4,101,520

[45] Jul. 18, 1978

[54] METHYLATED, METHYLOLATED MELAMINE COMPOSITION

[75] Inventor: Leslie Boldizar, Wallingford, Conn.

[73] Assignee: American Cyanamid Company, Stamford, Conn.

[21] Appl. No.: 706,344

[22] Filed: Jul. 19, 1976

[51] Int. Cl.$^2$ .............................................. C08G 9/24
[52] U.S. Cl. ............................. 528/248; 260/29.4 R; 260/29.4 UA; 260/850; 260/851; 260/853; 260/855; 260/856
[58] Field of Search ............ 260/67.6 R, 29.1, 29.4 R, 260/29.4 UA, 850, 851, 853, 855, 856

[56] References Cited

U.S. PATENT DOCUMENTS

| 2,197,357 | 4/1940 | Widmer et al. | 260/67.6 R |
|---|---|---|---|
| 3,894,993 | 7/1975 | Blank | 260/67.6 R |
| 3,919,350 | 11/1975 | Iwasawa et al. | 260/67.6 R X |
| 3,954,715 | 5/1976 | Fang | 260/67.6 R |
| 3,960,983 | 6/1976 | Blank | 260/67.6 R X |
| 3,965,058 | 6/1976 | Yurcheshen et al. | 260/67.6 R X |
| 3,966,665 | 6/1976 | Sakata et al. | 260/67.6 R X |

*Primary Examiner*—Thomas De Benedictis, Sr.
*Attorney, Agent, or Firm*—James T. Dunn; John L. Sullivan

[57] ABSTRACT

A methylated, methylolated melamine composition having a certain combined formaldehyde content, a certain combined methanol content in the form of methoxymethyl groups, a certain -NH content and a certain content of a free methylol groups, the process of preparing the same and the use of such a melamine composition in admixture with other polymeric materials to provide coating compositions.

1 Claim, No Drawings

METHYLATED, METHYLOLATED MELAMINE COMPOSITION

BACKGROUND OF THE INVENTION

Alkylated, alkylolated triazine compositions have been known for over forty years. The U.S. Pat. No. 2,197,357 shows the reaction products of a host of triazines with a substantial plurality of different aldehydes and alkylated with a plurality of compounds containing at least one alcoholic hydroxy group. More particularly, this U.S. patent shows the preparation of methylated, methylolated melamine compositions. Because of the substantial number of variables such as the selection of the particular reactants, the mole ratios, the conditions of reaction and the like, a veritable myriad of different products can be produced. These products range from simple compounds such as hexakismethoxymethyl melamine which is a monomeric material but which is capable of being converted into a resinous material or which can be used with other polymeric materials as a cross-linking agent, to other reaction products which are, in fact, resinous which resinous materials result from the condensation reaction of terminal moieties in the triazine material such as the methoxymethyl groups or the methylol groups reacting with one another or with themselves. In the condensation reaction methanol may be given off or water or both.

FIELD OF THE INVENTION

The present invention is in the field of methylated, methylolated melamine compositions having a certain combined formaldehyde content, a certain combined methanol content in the form of methoxymethyl groups, a certain —NH content and a certain content of free methylol groups and the process of preparing such a melamine composition and the use of such a melamine composition as a cross-linking agent when used in a mixture with other polymeric materials to provide coating compositions.

DESCRIPTION OF THE PRIOR ART

The known prior art is represented by the U.S. Pat. No. 2,197,357, cited hereinabove, as well as the U.S. Pat. No. 2,715,619 and the Canadian Patent 773,170. Representative of those U.S. patents that show the combination of cross-linking agents with water-dispersible, non-gelled polymeric materials are the U.S. Pat. No. 3,471,388 and 3,661,819. All of these U.S. patents cited hereinabove are incorporated herein by reference.

SUMMARY OF THE INVENTION

This invention relates to certain methylated, methylolated melamine compositions having a combined formaldehyde content of between about 3.5 to 5.0 moles per mole of melamine; a combined methanol content in the form of methoxymethyl groups of between about 3.0 to 4.5 moles per mole of melamine; an —NH content of the product is between about 0.7 and 1.7 moles per mole of melamine and the content of free methylol groups is less than 0.5 mole per mole of melamine. It is preferred to have a combined formaldehyde content between about 3.9 to 4.5 moles per mole of melamine; a combined methanol content in the form of methoxymethyl groups of between about 3.1 to 4.0 moles per mole of melamine; an —NH content of between about 0.8 and 1.3 moles per mole of melamine and a content of free methylol groups of between about 0.1–0.4 mole per mole of melamine.

The melamine is reacted with formaldehyde in the first step of the reaction, in which reaction formaldehyde or compounds engendering formaldehyde may be used such as paraformaldehyde, trioxymethylene and the like. Aqueous solutions of formaldehyde may be used but it is generally desirable to use either high concentrations of formaldehyde in water or solutions of formaldehyde or paraformaldehyde in methanol, while the preferred starting material would be methyl formcel. Regardless of which form of formaldehyde is used, the initial reaction is conducted in the presence of methanol at a pH between about 8.0 and 10.5 at a temperature between about 25° C. and reflux until substantially all of the methylolated melamine reaction product has been produced, which is indicated sometimes by a precipitation of some of the methylolated melamine reaction product. This is particularly true when higher levels of formaldehyde are used. This is the end of the methylolation step and one then undertakes to accomplish the methylation step at which time one adds sufficient methanol, to the methanol already present in the system, in order to provide at least 8 moles of methanol per mole of melamine while adjusting the pH to below about 5 and heating the reaction mass at a temperature below about 50° C. so as to react the methanol with the methylolated melamine reaction product until the resin syrup clears. This is the end of the first methylation step and the pH is then adjusted to above about 7 in order to stop the methylation reaction and there is then removed from the system any unreacted methanol and any water present either by virtue of its original presence or by virtue of condensation. This removal of the methanol and the water is accomplished by distillation until about 70% to about 90% of the calculated distillate has been removed. This distillation can be accomplished by atmospheric distillation followed by vacuum distillation or it can be accomplished completely by vacuum distillation or completely by atmospheric distillation. There is then added to the reaction mass at least 6 more moles of methanol and the reaction mass is cooled to a temperature below about 50° C. and the pH is adjusted to below about 5. The reaction temperature is held at about 50° C. or below until the content of free methylol groups is less than about 0.5 mole per mole of melamine. Thereupon the pH is adjusted to above about 7 and the unreacted methanol and the water of condensation is distilled off. As in the first methylation step, the distillation can be conducted at atmospheric pressure or under vacuum distillation. Frequently, the vacuum distillation will proceed more rapidly.

It is preferred, in the methylolation step, to use the melamine and formaldehyde in a mole ratio of about 1:4.0–5.0 melamine:formaldehyde respectively. It is preferred to adjust the pH during this methylolation step to a point between about 8.5 and 10.0 while controlling the temperature between about 50° C. and reflux. In the first methylation step it is preferred to control the pH to a point below about 4.5 while heating the mixture at a temperature between about 25° C. and 45° C. After the resin syrup clears, it is preferred to adjust the pH to a point above about 8. The unreacted methanol and some unreacted formaldehyde and the water is removed by distillation as before. In the second methylation step it is preferred to add at least about 8 moles of methanol and cooling the reaction mass to a point between about 25° C. and 45° C. while adjusting the pH below about 4.5 and holding the reaction temperature between about 25° C. and 45° C. until the content of free methylol groups is between about 0.1 and 0.4 mole per mole of melamine. The pH is then adjusted to a point above about 8 and the unreacted methanol and the water of condensation is distilled off.

It has been stated hereinabove that one can use aqueous solutions of formaldehyde such as formalin, which has a concentration of formaldehyde in water between about 40 and 55% but it is preferred to use at most a minimum amount of water, if any. That is why it is preferred to use the methanol as the medium for the first reaction especially if the formaldehyde is used in the form of paraformaldehyde. The same is true when the methyl formcel is used. The amount of the methanol used in the methylolation step should be in an amount at least sufficient to ensure the formation of a slurry of the melamine and the paraformaldehyde. Larger quantities of the methanol may be used if desired such as using at least 6 or 8 moles of methanol per mole of melamine. The methanol provides the medium for the reaction between the formaldehyde and the melamine during the methylolation step and then after the pH adjustment of the acidic side, the methanol is already present as a reactant which will methylate the methylolated melamine reaction product. The reaction temperature in the methylolation step can be varied between about 25° C. and reflux but it is known that the reflux temperature shortens the reaction time, whereas at room temperature the length of the reaction time is significantly greater. It is possible that some measure of resinous material is developed during the methylolation step such as dimers, trimers, and tetramers but it is preferred to keep the monomeric content high going into the methylation step. One can determine the endpoints of the methylolation by analyzing the liquid reaction product for free formaldehyde content. In order to determine the methylation step endpoint one can take a sample of the product and make a Karl-Fischer water determination. On the other hand one can predetermine from experience when the various endpoints have been reached or by tolerance measurements. In order to keep the —NH content up, one needs to use a low temperature, a high acid concentration and a high methanol content plus an original formaldehyde content below about 5 moles. In all of these reaction steps, the temperature, the time or duration of the reaction and the pH are all closely interrelated and interdependent.

The cross-linking agents of the present invention will find utility principally in the area of coating resins wherein non-gelled polymeric materials of a broad class can be combined with these cross-linking agents so as to provide coating compositions which may be utilized either in a water base system or in an organic solvent system. These non-gelled polymeric materials when used in an aqueous dispersion will be water-dispersible or treated so as to make them water-dispersible whereas when these non-gelled polymeric materials are used in an organic solvent soluble system, these non-gelled polymeric materials will be organic solvent soluble or organic solvent dispersible polymeric materials. These non-gelled polymeric materials contain certain reactive groups including any one or more of carboxyl groups, alcoholic hydroxyl groups or amide groups. The amount of said groups that is present in said polymeric material may be varied between about 2%, by weight, and not more than about 20%, by weight, based on the total weight of said polymeric material wherein said groups are heat reactive with the methylated, methylolated melamine compositions of the present invention. The amount of the methylated, methylolated melamine composition used in these coating compositions may be varied between about 5 to about 40%, by weight, and the non-gelled polymeric material will be present in the coating composition correspondingly from about 95 to about 60%, by weight, wherein the percentages of the (A) namely, the methylated, methylolated melamine composition and the (B) namely, the non-gelled polymeric material, by weight, total 100% and are based on the total solids weight of (A) and (B). Any one of these reactive groups may be present in the polymeric material to the exclusion of the other reactive groups or all three of these three reactive groups may be present in the polymeric material simultaneously. These polymeric materials may be anionic or non-ionic. These polymeric materials may be any one of a plurality of vinyl monomers which may be prepared by polymerizing polymerizable monomers containing reactive carboxyl groups such as acrylic acid, methacrylic acid, crotonic acid, cinnamic acid, $\beta$-benzoyl acrylic acid and polycarboxylic acids of the $\alpha,\beta$-ethylenically unsaturated class such as maleic, fumaric, itaconic, mesaconic, aconitic and the halogenated acids such as the halogenated maleic, or more specifically, chloromaleic acid and the like. These carboxyl group containing monomers can be used either singly or in combination with one another in the required amount and may be used with other polymerizable monomers that contain reactive alcoholic hydroxy groups or the reactive amide groups or may be used with other monomers which contain no reactive groups other than the reactive ethylenic double bond including no carboxylic groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate and the like. These polymerizable monomers, devoid of any reactive groups, may be used singly or in combination with one another in copolymerizing with a monomer containing a reactive group of the class described. Still further, one could use such other polymerizable compounds containing no reactive groups such as styrene, 0-, m-, or p-alkyl styrene such as the 0-, m-, or p-methyl, ethyl, propyl and butyl styrenes, 2,4-dimethyl styrene, 2,3-dimethyl styrene, 2,5-dimethyl styrene, vinyl naphthalene, methyl vinyl ether, n-butyl vinyl ether, phenyl vinyl ether, acrylonitrile, methacrylonitrile, halo ring or side chain styrenes such as $\alpha$-chloro styrene, 0-, m-, or p-chloro styrene, 2,4-dichlorostyrene, 2,3-dichlorostyrene, 2,5-dichlorostyrene or the alkyl side chain styrenes such as the $\alpha$-ethylstyrene and the like.

If one wishes to prepare a polymeric material as component (B), utilizing a polymerizable monomer containing a reactive alcoholic group, one may use such polymerizable vinyl monomers as the hydroxy alkyl esters of the $\alpha,\beta$, unsaturated carboxylic acids such as the hydroxy alkyl esters of acrylic acid, methacrylic acid, maleic, fumaric, ethacrylic and the chloro as well as the other halo substituted acrylic acids. These esters may either have a primary or a secondary hydroxyl group. Illustrative of the types of compounds that can be used to make the polymers containing the reactive alcoholic hydroxy groups are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexyl methacrylate, 6-hydroxyoctyl methacrylate, 8-hydroxyoctyl methacrylate, 10-hydroxydecyl methacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another or with the polymerizable vinyl monomers devoid of any reactive group including those set forth hereinabove in the discussion of the carboxyl group-containing monomers. Obviously, these hydroxy ester monomers may be used in combination with the reactive carboxyl group-containing monomers set forth hereinabove.

Among the amide group-containing monomers which may be used to prepare the polymeric material identified as component (B) are acrylamide, methacrylamide, ethacrylamide and the like. These polymerizable acrylamides may be used to prepare the polymeric materials used in the present invention with any of the carboxyl group-containing monomers and/or the hydroxyl group-containing monomers or with any of the polymerizable monomers set forth hereinabove that are devoid of any reactive groups. These polymeric materials whether they contain the reactive carboxyl groups and/or the reactive alcoholic hydroxy groups and/or the reactive amide groups will be anionic or non-ionic polymeric materials.

Additionally, one can make use of polyester resin compositions which are organic solvent dispersible, non-gelled, polymeric materials. Organic solvent dispersible alkyd resins, whether oil free or glyceride oil-containing, may be used and a plurality of these materials are commercially available and are also well known in the art and, as a consequence, it is not deemed necessary to make any prolonged recitation of such materials since they are fundamentally prepared by reacting a polyhydric alcohol with a polycarboxylic acid or with anhydrides such as phthalic anhydride, maleic anhydride, and the like.

Additionally, one can use certain polyether polyols such as those prepared by reacting one mole of bis-phenol A and/or hydrogenated bis-phenol A with at least 2 moles of ethylene oxide and/or propylene oxide.

DESCRIPTION OF THE PREFERRED EMBODIMENTS

The cross-linking agents produced according to the present invention can be used in water reducible systems and as a result, have the following outstanding attributes. These cross-linking agents permit one to achieve a good cure of a coating resin at low temperatures and show improved humidity resistance as compared to those fully alkylated and fully methylolated melamine reaction product compounds such as the hexakismethoxymethylmelamine. When compared to partially alkylated and partially methylolated melamine resins, the cross-linking agents of the present invention display improved stability, improved humidity resistance and reduced weight loss on curing.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

EXAMPLE 1

Into a suitable reaction vessel equipped with a stirrer, reflux condenser and thermometer there is introduced 800 parts of methanol, 2.2 parts of sodium bicarbonate and 742 parts of paraformaldehyde (91% $CH_2O$). The mixture is heated to about 60°–62° C. in order to dissolve the paraformaldehyde. Thereupon 630 parts of melamine are added to the reaction vessel. At this point, the mole ratio of the reactants is M/F/Me = 1.0/4.5/5.0. The mixture is then heated to reflux (75°–80° C.) and held for one hour. The heat is turned off and 1600 parts of methanol is then added to the reaction vessel. At this stage, the mole ratio of the reactants is M/F/Me = 1.0/4.5/15.0 respectively. The mixture is then cooled to 50° C. and there is added 158 parts of a 70% nitric acid solution in water. When the milky resin clears, the charge is cooled to about 30°–35° C. and held at that temperature for about 30 minutes. Thereupon, there is added 138 parts of a 50% caustic solution. Vacuum distillation is then begun in order to remove the volatiles. Thereupon, there is charged 2400 parts of methanol and the batch is cooled to about 30° C. There is then added an additional 150 parts of a 70% nitric acid solution and the batch is held at about 30°–35° C. for about one hour. Thereupon, there is charged 138 parts of a 50% aqueous caustic solution and the volatiles are then removed with vacuum concentration and the solids content is adjusted to about 88 ± 2% by the addition of a 1/1 blend, by weight, of isopropanol/isobutanol. The composition of this resin is of MF 4.2 Me 3.8 as established by analysis. The average degree of polymerization as calculated from gel phase analysis and molecular weight determinations is about 3.0. This means on the average 3.0 triazine moieties are linked together. The methylol content of this product is 1. weight percent or about 0.12 mole of methylol groups per triazine ring. The calculated NH content is about 1.1 moles NH per triazine ring. This product will be identified hereinbelow as cross-linking agent A.

EXAMPLE 2

The process of Example 1 is repeated in all essential details except that the formaldehyde charge was reduced from 4.5 to 4.0 moles per mole of melamine. The resulting product had a combined M/F/Me ratio of 1.0/4.0/3.7. The average degree of polymerization was about 4.0 and the calculated NH content was 1.25. The free methylol content was about 0.2 to 0.3 mole per triazine moiety. This product is identified hereinbelow as cross-linking agent B.

EXAMPLE 3

The process of Example 1 is repeated in all essential details except that the methanol charged in the first and second methylation steps was reduced to 10 moles of methanol per mole of melamine. The alkylation temperature was also reduced to 35° C. in both alkylation steps and the acid charge was reduced by one-half. The resulting product had a viscosity of X-Y when measured on an 80% solids solution in an isopropanol/isobutanol mixed solvent at a solvent ratio of 1/1. The combination M/F/Me ratio was 1/4.2/3.7. (Nuclear magnetic resonance measurements give a methanol ratio of 3.2. The 3.7 value was obtained by standard analytical techniques). The final product has a high monomer content as determined by gel phase analysis and a calculated average degree of polymerization of 2.25. The methylol content is about 0.35 to 0.4 per mole of triazine. The calculated NH content is 1.24. This product is identified as cross-linking agent C.

COMPARATIVE EXAMPLE 4

This cross-linking agent is a commercially available methylated melamine-formaldehyde cross-linking agent and is set forth herein for comparative purposes. This cross-linking agent identified as cross-linking agent D, has an average composition of M/F/Me of 1/5.2/3.5 and a methylol content of 1.1/1.2 per mole of triazine moiety and an average degree of polymerization of 3.03. This polymeric cross-linking agent also has a calculated NH content of 0.13 mole of NH per mole of triazine.

COMPARATIVE EXAMPLE 5

The cross-linking agent in this example (agent E) is a commercially available fully methylated melamine-formaldehyde composition with an average melamine/formaldehyde/methanol mole ratio combined of 1/6.0/5.2 and a methylol content of 0.1–0.2 mole per mole of triazine and an average degree of polymerization of 1.67 and a calculated NH content of about 0–0.1 NH per triazine ring.

EXAMPLE 6

A water-dispersible acrylic terpolymer having a composition of butylacrylate/styrene/acrylic acid in a weight ratio of 55/30/15 respectively is blended separately in three different batches with cross-linking agent A, cross-linking agent D and cross-linking agent E. In the first two blends the resin to cross-linking agent ratio is 60/40 whereas in the cross-linking agent E blend the resin to cross-linking agent ratio is 80/20 because a larger amount of cross-linking agent E inhibits the cure of the coating composition. The blends of the acrylic terpolymer with these cross-linking agents are pigmented with titanium dioxide in a pigment to binder ratio of 0.8/1.0 respectively. Films were drawn down on Bonderite 1000 steel panels from each of these three blends of the acrylic terpolymer and the respective cross-linking agents in a film thickness of 1.0 mil and the films were cured at 300° F. (149° C.) for 20 minutes. The cured films were subjected to exposure in a Cleveland humidity test chamber for a plurality of days and the thus tested panels were inspected for gloss, 60° and blistering. The results of these tests are shown hereinbelow in Table I.

TABLE I

| Gloss, 60°: | CLA A | CLA D | CLA E |
| --- | --- | --- | --- |
| Initial | 95 | 93 | 99 |
| After 3 Days | 94 | 79 | 95 |
| After 6 Days | 89 | 67 | 91 |
| After 9 Days | 82 | — | 56 |
| After 14 Days | 67 | — | 25 |
| After 17 Days | 63 | — | — |
| After 20 Days | 52 | — | — |
| *Blistering: | | | |
| After 3 Days | 10 | 8 MD | 10 |
| After 6 Days | 9 M | 7 D | 10 |
| After 9 Days | 9 M | — | 6 MD |
| After 14 Days | 8 MD | — | 4 D |
| After 17 Days | 8 MD | — | — |

TABLE I-continued

| After 20 Days | 8 D | — | — |
| --- | --- | --- | --- |

*Blistering:
M = Medium
MD = Medium - Dense
D = Dense
10 = No Blister
9 = Very Fine Blisters
8 = Slightly larger Blisters
6 = Larger Blisters
4 = Very large Blisters It can be seen from the results shown in Table I hereinabove that the cross-linking agent A containing coating composition of the present invention gives cured films with significantly improved humidity resistance when compared with the comparative cross-linking agents D and E containing coating compositions.

EXAMPLE 7

A commercially available solvent borne acrylic polymer, identified as Rohm and Haas AT-56, having a hydroxyl number of 88 and an acid number of 30 is pigmented with titanium dioxide and is then blended separately with cross-linking agents A, B, C, and D. The resin to cross-linking agent ratio is 70/30 respectively and the pigment/binder ratio is 80/100 respectively. The theoretical non-volatile content is adjusted to 65.2 weight percent. This non-volatile content is confirmed by carefully determining the solids by a foil method for 45 minutes at 45° C. This solids method prevents any decomposition of the melamine compound and prevents cross-linking reaction. Films drawn down from each of these four blended coating compositions, after baking under regular baking conditions, showed increased weight loss or lower weight solids. This is due to the cross-linking reaction of the amino compound. Because of ecological, economical and health reasons, it is desired to have the least weight loss of the amino resin during the baking process. Cross-linking agents of the present invention have significantly reduced weight loss as shown in Table II hereinbelow.

TABLE II

| | CLA A | CLA B | CLA C | CLA D |
| --- | --- | --- | --- | --- |
| Enamel Non-Volatile, % | 65.23 | 65.23 | 65.23 | 65.27 |
| Amino Resin, % | 10.81 | 10.80 | 10.81 | 10.85 |
| Non-Volatile, %, 20' at 149° C. | 64.00 | 63.95 | 63.90 | 62.50 |
| Weight Loss, % | 1.23 | 1.28 | 1.33 | 2.77 |
| Weight Loss Based on Amino Resin, % | 11.40 | 11.90 | 13.30 | 25.50 |

As can be seen from Table II, the amino compositions of the present invention have about half of the weight loss during the baking cycle as is shown in cross-linking agents A, B and C when compared with the commercially available amino cross-linking agent D.

The NH content of a melamine/formaldehyde reaction product is normally difficult to measure. Titration with an acid gives some indication of NH content. The NH content can also be calculated using the following equation:

$$NH = (6DP - XDP - DP + 1)/DP$$

$NH$ = mole NH per melamine
$DP$ = average degree of polymerization
$X$ = moles of combined formaldehyde per melamine The average degree of polymerization can be obtained by gel phase analysis or by average molecular weight determinations. The combined formaldehyde can be determined by the standard published techniques.

The methylated, methylolated melamine compositions of the present invention have mainly methoxymethyl groups as functional sites and it is therefore surprising that coating compositions containing these melamine compositions cure at the same speed as certain commercially available partially methylated, partially methylolated melamine cross-linking agents in the absence of a strong acid catalyst. Commercially available fully methylated, fully methylolated melamine cross-linking agents do require a strong acid catalyst in order to cure at a reasonable speed. In water-borne paint formulations, it has been found that the cross-linking agents of the present invention give superior humidity resistance under marginal cure conditions when compared with the commercially available melamine cross-linking agents. The cross-linking agents of the present invention also have the advantage of containing lower amounts of free formaldehyde which can cause occasional odor problems.

I claim:

1. A methylated, methylolated melamine composition having a combined formaldehyde content of about 4.0 to 4.2 moles per mole of melamine; a combined methanol content in the form of methoxymethyl groups of about 3.7 to 3.8 moles per mole of melamine; an —NH content of about 1.1 to 1.25 moles per mole of melamine and a content of free methylol groups of about 0.12–0.4 mole per mole of melamine.

* * * * *